Patented June 9, 1942

2,285,511

UNITED STATES PATENT OFFICE 2,285,511

PHTHALIMIDE COLORING MATTER

Norman Hulton Haddock, Blackley, Manchester, England, assignor to Imperial Chemical Industries Limited, a corporation of Great Britain No Drawing. Application October 19, 1939, Serial No. 300,282. In Great Britain October 21, 1938

14 Claims. (Cl. 260—243)

This invention relates to the manufacture of new coloring matters.

According to the invention we manufacture new coloring matters by the process which comprises causing to interact under the influence of heat and, if desired, in the presence of a solvent or diluent, a heterocyclic compound containing a reactive methylene group in the heterocyclic ring and either an imino-phthalimide, or in the presence of a substance facilitating the removal of water, a phthalimide and then, if desired, in either instance sulphonating the resulting compounds.

The new compounds which are obtained before sulphonation are useful as coloring matters or as intermediates for the manufacture of coloring matters and on our findings the compounds are to be regarded as the products of a condensation reaction involving 1 molecule of the said heterocyclic compound and 1 molecule of whichever of the other compounds mentioned is used. The condensation takes place with loss of ammonia when using an iminophthalimide and with loss of water in the other instance as typified by the following equations:

wherein Z stands for the radical of an aromatic-heterocyclic compound having a reactive methylene group ($CH_2$) in the heterocyclic ring and is attached to the double-bonded C-atom in the above formula (C=) through the carbon atom of said reactive methylene group.

The new sulphonated compounds are soluble or sparingly soluble in water and are useful as coloring matters especially as acid dyestuffs and also for the production of lake colors.

In effecting the said interaction, the compounds mentioned may be used as starting materials or other starting materials yielding the said compounds under the conditions of the interaction may be employed instead. As examples there may be mentioned o-cyanobenzamide, a mixture of phthalic anhydride or phthalimide, with urea and ammonium molybdate, and a mixture of phthalic acid diamide and zinc chloride: these may be used instead of iminophthalimide, since they yield iminophthal-

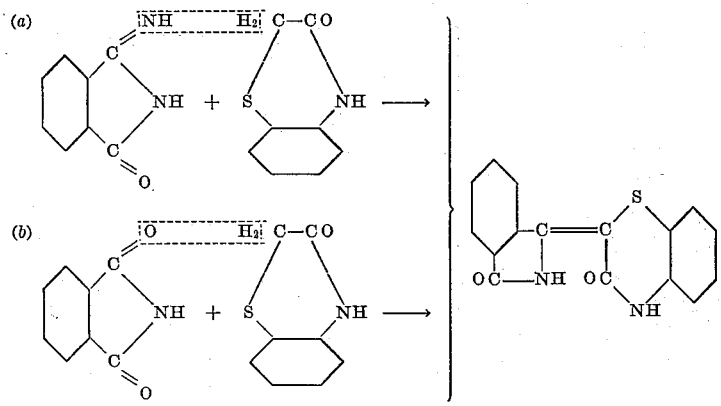

In either instance the residue of a phthalimide is seemingly present in the product in a form which may be represented by the formula (when an unsubstituted imino-phthalimide or phthalimide is used):

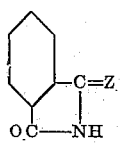

imide on heating (for instance, according to the following equation

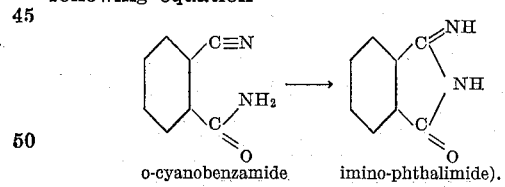

o-cyanobenzamide    imino-phthalimide).

The invention is illustrated but not limited by the following examples in which the parts are by weight.

Example 1

14.6 parts of o-cyanobenzamide and 21.4 parts of 7-chloro-5-methyl 3-keto-2:3-dihydrobenz-1:4-thiazine are heated together at 250–260° C. for one hour. During this time there is evolution of ammonia. The melt is cooled, powdered, and extracted with boiling ethylene glycol monomethyl ether to remove unchanged starting materials.

The residue is a yellow crystalline powder, M. P. 336–7° C. It is soluble in concentrated sulphuric acid with a bright red color. The coloring matter can be obtained as a finely-divided paste which is suitable for use as a pigment, by dissolving 1 part of the dry compound in 10 parts of 94% sulphuric acid, pouring the resulting solution into 700 parts of water, filtering, washing and drying. Its composition is believed to correspond to the formula

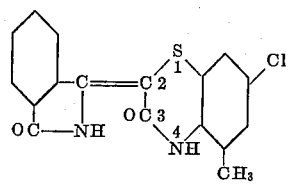

As a pigment coloring matter, it gives on paper bright yellow shades of good fastness and in rubber it yields yellow shades which are practically non-bleeding.

Example 2

2 parts of the product of Example 1 are dissolved in 10 parts of oleum (20% SO₃) and the solution warmed to 90–95° C. for about half an hour and until a test portion of the product is found to be completely soluble in water. The mixture is then poured on to 50 parts of ice and the precipitate is filtered off and washed with a saturated aqueous solution of sodium chloride. The washed precipitate is dissolved in hot dilute aqueous sodium hydroxide solution, sodium chloride is added until all the dyestuff is precipitated, and the precipitate is filtered and dried. The dry product is yellow. It is a sulphonic acid and an acid wool dyestuff and dyes wool in yellow shades of good fastness.

Example 3

When the same quantity of 5:6-benzo-3-keto-2:3-dihydrobenz-1:4-thiazine is used instead of the 7-chloro-5-methyl-3-keto-2:3-dihydrobenz-1:4-thiazine in the process of Example 1, an orange crystalline powder is first obtained, and then after the treatment with sulphuric acid a bright orange pigment of good light fastness. The compound may be sulphonated in oleum (2% SO₃) to give a bright orange acid wool dyestuff.

The pigment when used for coloring rubber yields orange shades which are practically non-bleeding.

Example 4

10 parts of 6-chloro-4-methylthioindoxyl and 7.5 parts of o-cyanobenzamide are heated together at 240–250° C. for 2 hours. During this time there is evolution of ammonia. The mixture is cooled, powdered and extracted with boiling ethylene glycol mono ethyl ether. The residue is crystallised from boiling nitrobenzene. The recrystallised product which is bronze in appearance dissolves in concentrated sulphuric acid with a yellowish-brown color. Its composition most probably corresponds to the formula

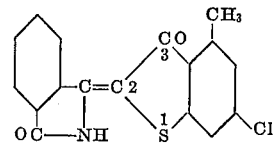

It can be obtained suitable for use as a pigment by treatment with sulphuric acid as in Example 1. This pigment yields orange-yellow shades on paper which are of good fastness to light. The product may be sulphonated by stirring at 25–30° C. in 5% oleum. The sulphonic acid dyes wool from an acid bath in orange-yellow shades of good fastness to washing, milling and perspiration.

Example 5

When an equal weight of 2:1-naphthathioindoxyl is used instead of the 6-chloro-4-methylthioindoxyl in the process of Example 4, a product is obtained which after crystallisation from α-chloronaphthalene forms large red-brown crystals soluble in concentrated sulphuric acid with an orange color. The product, which presumably corresponds to the formula

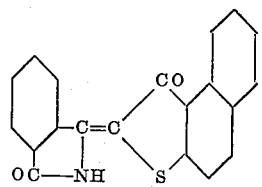

is converted to a finely-divided pigment by treatment with sulphuric acid as in Example 1. This pigment colors paper in orange shades of good fastness to light.

The compound is sulphonated by stirring it in 5–10% oleum at 10–15° C. The sulphonic acid is soluble in water and dyes wool and cotton in orange shades.

Products similar to the above are obtained when 6-ethoxy-thioindoxyl is used instead of 2:1-naphthathioindoxyl.

When 2:3-naphthathioindoxyl is used, in place of 2:1-naphthathioindoxyl, a red pigment dyestuff is obtained.

Example 6

13.3 parts of oxindole and 14.6 parts of o-cyanobenzamide are heated together at 180° C. until the mixture solidifies, and then heated at 240° C. for about five hours and the product isolated as in Example 1.

It is yellow crystalline powder, soluble in concentrated sulphuric acid with a red-orange color, and probably corresponds to the formula

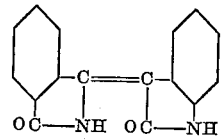

After treatment with sulphuric acid as in Example 1, the product is suitable for use as a pigment and gives orange shades on paper of very good light fastness. It dyes acetate artificial silk from aqueous suspension in yellow shades, of very good light fastness.

Example 7

16.1 parts of 2:4-diketo-1:2:3:4-tetrahydroquinoline and 14.6 parts of o-cyanobenzamide are heated together at 240-250° C. for 4 hours. The mixture is cooled, powdered and extracted with boiling α-chloronaphthalene to remove soluble impurities. The residue is a reddish-brown powder which dissolves in concentrated sulphuric acid with a reddish-brown color, and probably corresponds to the formula

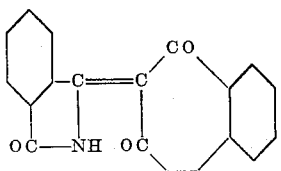

*Example 8*

21.4 parts of 7-chloro-5-methyl-3-keto-2:3-dihydrobenz-1:4-thiazine, 14.7 parts of phthalimide, 20 parts of anhydrous zinc chloride and 150 parts of α-chloronaphthalene are mixed together and boiled with stirring under a reflux condenser for six hours. The solution is cooled, and the resulting yellow crystalline precipitate filtered, washed with benzene and dried. The product is the same as that of the first part of Example 1.

*Example 9*

26 parts of powdered anhydrous aluminum chloride and 12 parts of dry sodium chloride are heated together until a fused mass is obtained. To this there are added 7.5 parts of phthalimide and 10 parts of 7-chloro-5-methyl-3-keto-2:3-dihydrobenz-1:4-thiazine and the mixture is stirred at 220-230° C. for several hours until no more coloring matter is produced, cooled, powdered, extracted with dilute hydrochloric acid, and the residue crystallised from α-chloronaphthalene. The product is the same as that of the first part of Example 1.

Similar products are obtained when 8 parts of N-methylphthalimide or 10.8 parts of 3:6-dichlorophthalimide are used instead of the 7.5 parts of phthalimide in the above process.

*Example 10*

12 parts of iminophthalimide, 12 parts of N-methyloxindole and 100 parts of technical α-chloronaphthalene are heated to the boiling point of the mixture for 8 hours. The solution is cooled and the resulting orange crystalline precipitate filtered, washed with benzene and dried. The product, M. P. 180-185° C. and probable formula

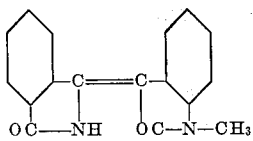

is converted to a finely-divided form suitable for use as a pigment or as a dyestuff for acetate artificial silk by dissolving in boiling pyridine, pouring the solution into cold water, filtering off the resulting orange-yellow precipitate, washing with water and drying. As a pigment, it yields bright orange shades on paper of very good light fastness. It has good affinity for acetate artificial silk and yields fast yellow shades when dyed on this fibre from aqueous suspensions at 75-80° C.

When 11 parts of either 1:3- or 1:4-dihydroxy-isoquinoline are used in the above process, in place of 12 parts of N-methyloxindole, yellow pigments are obtained, which are dyestuffs for acetate artificial silk.

*Example 11*

14.7 parts of phthalimide, 50 parts of urea and 0.05 part of ammonium molybdate are heated and stirred at 160-170° C. for 1 hour: iminophthalimide is generated. To this mixture there are then added 21 parts of 7-chloro-5-methyl-3-keto-2:3-dihydrobenz-1:4-thiazine and heating and stirring continued at 200-210° C. for 1½ hours. The melt is cooled, powdered and boiled successively with dilute aqueous hydrochloric acid, dilute aqueous sodium hydroxide solution and ethyl alcohol. The product is crystallised from technical α-chloronaphthalene. It is identical with the product of Example 1.

It will be noted that our invention leads to a new series of chemical compounds which possess the general structure

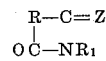

wherein R is a benzenoid ortho-arylene radical and may carry substituents such as halogen or sulfo (which latter may be introduced by sulfonation, after synthesis); $R_1$ is hydrogen or a lower alkyl, as typified by methyl; Z is the radical of an aromatic-heterocyclic compound, having a reactive methylene group in the heterocyclic ring, and optionally carrying in the aryl ring (or rings) various common substituents such as halogen, methyl or sulfo (which latter may be introduced by sulfonation after synthesis of the color). In other words, Z is the bivalent radical of a compound containing at least one homocyclic ring and one heterocyclic ring sharing jointly two carbon atoms, as for instance in quinoline or thioindoxyl, and in which the homocyclic ring contains, directly or after tautomeric rearrangement, a $CH_2$ group adjacent to a CO group. The latter activates the former, and renders the two hydrogen atoms readily replaceable. The attachment of Z to the C-atom above shown (the double bonded C-atom) is through the carbon atom of the reactive methylene group.

The above group of compounds defined for Z will readily be recognized by those skilled in the art as being the group which are commonly coupled to indoxyl and thioindoxyl to produce indigoid dyestuffs, and are therefore commonly referred to as indigoid coupling components. (See for instance, Cain & Thorpe, Synthetic Dyestuffs and Their Intermediate Products, chapter XXII, pages 174 to 194.)

It will be further noted that, because the condensation takes place through the agency of a double bond, there exists the chance of cis and trans isomerism, and it is likely that the actual color is a mixture of the two compounds. It is therefore intended that the formulas given below in the claims shall not be regarded as limited to one or the other of these forms, but shall be construed as generic to both forms.

I claim:

1. A compound of the general formula

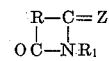

wherein R is a benzenoid aryl radical carrying the two C-atoms in ortho positions; $R_1$ is a member of the group consisting of hydrogen and lower alkyl; while Z stands for the radical of an aromatic-heterocyclic compound which is capable of being formulated in two tautomeric forms and which in one of said forms possesses in the heterocyclic ring a $CH_2$ group adjacent to a CO group, said radical Z being attached to the double-bonded C-atom in the above formula through the carbon atom of said CH₂ group.

2. A compound of the general formula

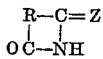

wherein R is a benzenoid aryl radical carrying the two C-atoms in ortho positions, while Z stands for the radical of an aromatic-heterocyclic compound which is capable of being formulated in two tautomeric forms and which in one of said forms possesses in the heterocyclic ring a CH₂ group adjacent to a CO group, said radical Z being attached to the double-bonded C-atom in the above formula through the carbon atom of said CH₂ group.

3. A compound of the general formula

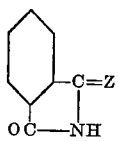

wherein Z stands for the radical of an aryl-3-keto-2,3-dihydro-1,4-thiazine, being attached to the C= atom in the above formula through its 2-carbon atom.

4. A compound of the general formula

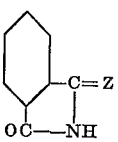

wherein Z stands for the radical of a thioindoxyl, being attached to the C= atom in the above formula through its 2-carbon atom.

5. A compound of the general formula

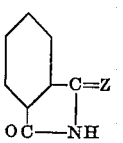

wherein Z stands for the radical of an oxindole, being attached to the C= atom in the above formula through its 3-carbon atom.

6. A compound of the general formula

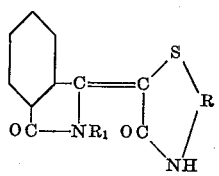

wherein R is an aromatic radical having not more than 10 C-atoms in the ring structure, and to which the S and NH are attached in ortho positions, while R₁ is a member of the group consisting of hydrogen and lower alkyl.

7. A compound of the general formula

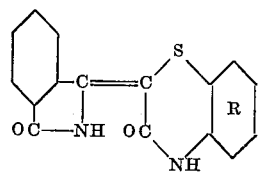

wherein the free positions of the benzene radical marked R are satisfied by substituents selected from the group consisting of hydrogen, lower alkyl and halogen.

8. A compound of the general formula

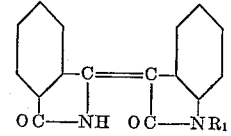

wherein R₁ is a member of the group consisting of hydrogen and lower alkyl.

9. The compound of the formula

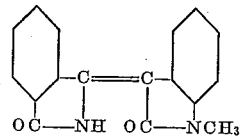

said compound being an orange-yellow crystalline solid, melting at about 180 to 185° C., yielding as a pigment bright orange shades on paper, and dyeing acetate artificial silk from an aqueous bath in yellow shades.

10. A process for the manufacture of coloring matters which comprises reacting an imino-phthalimide with an aromatic-heterocyclic compound having in the heterocyclic ring an atomic configuration selected from the tautomeric pair

11. A process for the manufacture of coloring matters which comprises heating together reagents adapted to yield an imino-phthalimide in situ, with an aromatic-heterocyclic compound having in the heterocyclic ring an atomic configuration selected from the tautomeric pair

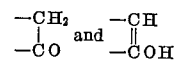

12. A process for the manufacture of coloring matters which comprises heating together o-cyano-benzamide and an aromatic-heterocyclic compound having in the heterocyclic ring an atomic configuration selected from the tautomeric pair

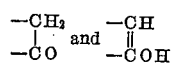

13. A process for the manufacture of coloring matters which comprises heating together imino-phthalimide and N-methyl-oxindole, and recovering the coloring matter thus obtained.

14. A process for the manufacture of coloring matters which comprises heating together o-cyano-benzamide and a 3-keto-2,3-dihydro-1,4-aryl thiazine, and recovering the coloring matter thus obtained.

NORMAN HULTON HADDOCK.